United States Patent [19]

Kalinowski et al.

[11] 4,289,859

[45] Sep. 15, 1981

[54] NON-BLEEDING TRANSPARENT SILICONE ADDITIVES FOR PLASTICS

[75] Inventors: Robert E. Kalinowski, Auburn; Gary A. Vincent, Midland, both of Mich.

[73] Assignee: Dow Corning Corporation, Midland, Mich.

[21] Appl. No.: 155,861

[22] Filed: Jun. 2, 1980

[51] Int. Cl.$^3$ .................... C08L 27/06; C08L 69/00; C08K 5/54

[52] U.S. Cl. .................... 525/104; 260/29.1 SB; 525/100; 525/106; 525/446; 525/464

[58] Field of Search ............ 525/100, 106, 104, 446, 525/464; 260/29.1 SB

[56] References Cited

U.S. PATENT DOCUMENTS

| | | | |
|---|---|---|---|
| 2,494,329 | 1/1950 | Carlin | 525/104 |
| 2,860,074 | 11/1958 | Hedlund | 525/104 |
| 2,999,835 | 9/1961 | Goldberg | 525/1 |
| 3,062,764 | 11/1962 | Osdal | 525/104 |
| 3,087,908 | 4/1963 | Caird | 525/464 |
| 3,150,207 | 9/1964 | Gore | 525/104 |
| 3,239,579 | 3/1966 | Barber | 525/104 |
| 3,449,465 | 6/1969 | Gölitz et al. | 525/446 |
| 3,673,146 | 6/1972 | Factor | 260/37 PC |
| 3,751,519 | 8/1973 | Bostick | 525/1 |
| 3,929,708 | 12/1975 | Brady | 260/29.1 SB |
| 4,197,384 | 4/1980 | Bialous et al. | 260/29.1 SB |

FOREIGN PATENT DOCUMENTS

2436152 2/1975 Fed. Rep. of Germany ...... 525/100

*Primary Examiner*—Wilbert J. Briggs, Sr.
*Attorney, Agent, or Firm*—Robert F. Fleming, Jr.

[57] ABSTRACT

Phenyl containing siloxane fluids are added to transparent thermoplastic polymers to give transparent thermoplastics having improved internal lubrication. For example, PhSi(OMe)$_3$ is equilibrated with (Me$_2$SiO)$_x$ to give a fluid containing 28 percent by weight phenyl radicals, a PhSiO$_{3/2}$ to Me$_2$SiO ratio of 0.72 and an OMe to Si ratio of 0.78. This fluid was added to polystyrene in amount of 1 percent by weight to give a transparent plastic which exhibits no bleed and had excellent surface lubricity.

3 Claims, No Drawings

NON-BLEEDING TRANSPARENT SILICONE ADDITIVES FOR PLASTICS

BACKGROUND OF THE INVENTION

This invention relates to transparent thermoplastic compositions having improved processability, improved mar resistance and reduced friction. More particularly, it relates to such compositions containing a transparent thermoplastic selected from polystyrene, polyvinyl chloride, polyethylene terephthalate, polybutylene terephthalate, acrylate polymers or polycarbonate, the compositions being modified by the addition of a fluid organosiloxane copolymer.

Minor amounts of polydimethylsiloxane fluids are often admixed with thermoplastics to provide the thermoplastic with beneficial properties such as reduced friction and wear, improved mar resistance and improved processability. Many such internally lubricated thermoplastic compositions have achieved considerable commercial success due to the improved properties obtained with minimal cost.

However, admixtures of polydimethylsiloxane fluids and thermoplastic polymers are not useful when transparent thermoplastic objects are desired because of the incompatibility of the polydimethylsiloxane with thermoplastic polymers. This incompatibility results in admixtures that are opaque or milky white in appearance even at very low levels of polydimethylsiloxane. For example, U.S. Pat. No. 3,087,908 discloses that polydimethylsiloxane gives detectable haze in polycarbonate films at concentrations as low as 200 parts per million with significant haze occurring at siloxane concentrations above 400 parts per million. While these low concentrations may provide some enhancement of film forming properties, they are not sufficient to provide the major processing and wear benefits of internal lubrication. As disclosed by U.S. Pat. No. 2,999,835 such benefits are obtained in polycarbonates at siloxane concentrations above 0.1 weight percent or even preferably at 1 weight percent or above. Similar results have been observed with other thermoplastic polymers.

It is a purpose of the present invention to provide internally lubricated transparent thermoplastic compositions. Further, it is a purpose of the present invention to provide an organosiloxane that is compatible with thermoplastic polymers at concentrations appropriate for effective internal lubrication. Still another purpose of the invention is to provide a compatible organosiloxane that can provide internal lubrication in thermoplastic polymers comparable to that obtained with polydimethylsiloxanes.

SUMMARY OF THE INVENTION

A transparent thermoplastic composition comprising in admixture a transparent thermoplastic resin selected from the group consisting of polystyrene, polyvinyl chloride, polyethylene terephthalate, polybutylene terephthalate, acrylic polymers, and polycarbonate and a minor amount of a fluid siloxane copolymer composed essentially of phenylsiloxane units of the general formula $(RO)_xC_6H_5SiO_{(3-x)/2}$ and dimethylsiloxane units of the general formula $(RO)_y(CH_3)_2SiO_{(2-y)/2}$ wherein R represents an alkyl radical having 1 to 6 carbon atoms, x is 2, 1 or 0 and y is 1 or 0, the siloxane copolymer having a ratio of phenylsiloxane units to dimethylsiloxane units in the range of 0.6 to 2, a phenyl radical content above 22 weight percent based on the total weight of the copolymer, and a ratio of alkoxy groups to silicon atoms above 0.3.

DETAILED DESCRIPTION OF THE INVENTION

The siloxane fluids used herein can be prepared by any of the methods known in the art such as by the partial cohydrolysis of phenyltrialkoxysilane and dimethyldialkoxysilane or partial cohydrolysis of the corresponding chlorosilanes followed by alkoxylation. The best way known to applicants at this time is the equilibration of phenyltrialkoxysilane with cyclic dimethylsiloxanes in the presence of an acid catalyst such as sulfonic acids followed by removal of volatile by-products.

The alkoxy group on the silicon can be any such group containing 1 to 6 carbon atoms such as methoxy, ethoxy, isopropoxy or hexyloxy. In order to obtain the desired clarity coupled with the improved internal lubrication of the thermoplastic, it is necessary that the critical ratios shown above be observed.

The fluids can be mixed with the thermoplastic polymers by any convenient method such as by the use of a common solvent or by mixing the fluid with the molten plastic in a screw-type injection molding machine. Any amount of fluid which gives the desired results can be used but preferably the fluid is used in amount of 0.1 to 5 percent by weight based on the weight of the thermoplastic.

The term "polystyrene" includes not only polystyrene per se but polymers of derivatives thereof such as polyalphamethylstyrene, polyvinyltoluene, poly-t-butylstyrene and copolymers thereof with styrene as well as transparent copolymers of styrene with minor amounts of other monomers such as acrylonitrile and butadiene. The term "acrylic polymers" includes both acrylates and methacrylates such as methyl methacrylate, ethyl methacrylate, ethyl acrylate and copolymers thereof.

The following examples are illustrative only and should not be construed as limiting the invention which is properly delineated in the appended claims.

EXAMPLE 1

A mixture of phenyltrimethoxysilane (965 g, 4.9 moles) and dimethylcyclosiloxanes (535 g, 7.2 equivalents) was circulated through a 3 m × 1.9 cm column packed with a sulfonic acid cation exchange resin (Amberlyst® 15, a product of Mallinckrodt Chemical Works, of St. Louis, Mo.). While the mixture circulated, effluent from the column was passed through a 45 cm Vigreau column maintained at 40°–50° C. and 1 mm Hg (~133 Pa) to remove volatile components. After 30 hours of circulating, the product was collected and stripped to a temperature of 150° C. at 1 mm Hg (~133 Pa). The product (940 g) was treated with fuller's earth and activated carbon to remove a haze. The product had a ratio of phenylsiloxane units to dimethylsiloxane units of 0.98, a phenyl radical content of 31 weight percent, and a ratio of methoxy groups to silicon atoms of 0.90 as determined by nuclear magnetic resonance analysis.

The transparency of the above siloxane product in combination with a transparent thermoplastic polymer was evaluated by the following procedure. Polyvinylchloride powder (5 g) and the siloxane product (0.25 g) were dissolved in 100 ml of tetrahydrofuran. The solvent was allowed to evaporate from the solution in a 10 cm diameter petri dish. Residual solvent was removed in a vacuum oven at 60° C. and 1 mm Hg (~133 Pa). The cast films were evaluated visually for clarity. Also, the films were evaluated for siloxane bleed by applying a strip of adhesive tape to the casting and to the petri dish. If the tape adhesion to the surfaces was normal and if subsequent adhesion of the tape to another surface was not significantly reduced, the composition was rated non-bleeding. Films cast with the above siloxane were visually clear and non-bleeding.

EXAMPLE 2

A mixture of phenyltrimethoxysilane (198 g, 1.0 mole) and dimethylcyclosiloxanes (148 g, 2.0 equivalents) was equilibrated in a batch process employing a sulfonic acid action exchange resin (34.6 g, Amberlyst ® 15). Low boiling equilibration products were removed while the mixture was maintained at 65° C. for 18 hours at ~1 mm Hg (~133 Pa) pressure. The product was stripped up to 150° C. at ~1 mm Hg to yield 246 g of siloxane copolymer. The copolymer was treated with fuller's earth and activated carbon to remove a haze. The copolymer had a ratio of phenylsiloxane units to dimethylsiloxane units of 0.80, a phenyl radical content of 29 weight percent, and a ratio of methoxy groups to silicon atoms of 0.88 as determined by nuclear magnetic resonance analysis.

Evaluation of the siloxane copolymer in a polyvinyl chloride casting as described in Example 1 indicated no apparent opacity or bleeding.

EXAMPLE 3

This example illustrates the effect on the transparency of a composition of the invention when the ratio of phenylsiloxane units to dimethylsiloxane units in the siloxane copolymer is varied. Cast films of vinyl chloride and several siloxane copolymers were prepared and evaluated as described in Example 1. The results are set forth in Table 1.

TABLE 1

| Siloxane Composition | | | Cast Film Properties | |
|---|---|---|---|---|
| Dimethylsiloxane Units | $C_6H_5$ Weight Percent | $CH_3O/Si$ | Transparent | Bleed |
| (1) 1.06 | 33 | .72 | Yes | No |
| (2) .72 | 28 | .78 | Yes | No |
| (3) .50* | 24 | .62 | No | No |
| (4) .30* | 19 | .32 | No | No |

*For comparison only

EXAMPLE 4

This example illustrates the effect on the transparency of a composition of the invention when the ratio of alkoxy groups to silicon atoms in the siloxane copolymer is varied.

A siloxane copolymer having a ratio of phenylsiloxane units to dimethylsiloxane units of 0.86, a phenyl radical content of 29 weight percent and a ratio of alkoxy groups to silicon atoms of 1.0 was prepared by the method of Example 1. Portions (150 g) of the siloxane copolymer were hydrolyzed with various amounts of water using 3 drops of tetrabutyltitanate and 3 drops of tetramethylguanidine trifluoroacetate as hydrolysis condensation catalysts. The partially hydrolyzed samples were vacuum stripped to 100° C. at about 1 mm Hg (~133 Pa) and filtered through diatomaceous earth to give a series of siloxane copolymers with different alkoxy group contents as shown in Table 2. Polyvinyl chloride compositions containing 5 weight percent of the siloxane copolymers were prepared and evaluated as described in Example 1.

TABLE 2

| Siloxane | | PVC Composition With 5 Percent Siloxane | |
|---|---|---|---|
| $(CH_3O)/Si$ | $C_6H_5$ Weight Percent | Transparent | Bleed |
| 1 | 29 | Yes | No |
| .82 | 30 | Yes | No |
| .65 | 32 | Yes | No |
| .53 | 33 | Yes | No |
| .37* | 34 | Yes | No |
| .22 | 35 | No | No |

*Siloxane contained less than 0.05 weight percent silanol.

EXAMPLE 5

This example illustrates the use of a siloxane copolymer containing hexyloxy groups to prepare transparent compositions of the invention.

Portions of the siloxane copolymer employed in Example 4 were mixed with various amounts of hexyl alcohol and 3 drops of tetramethylguanidine trifluoroacetate per 100 g of siloxane. After mixing for 30 minutes, the product was stripped first to 200° C. at atmospheric pressure and then to 100° C. at ~1 mm Hg (~133 Pa). The samples were analyzed by nuclear magnetic resonance to determine the extent of ester interchange. Polyvinyl chloride compositions containing 5 weight percent of the siloxanes were prepared and evaluated as described in Example 1. The results are set forth in Table 3.

TABLE 3

| Siloxane Composition | | | Cast Film Properties |
|---|---|---|---|
| $C_6H_{13}O/Si$ | $CH_3O/Si$ | $C_6H_5$ Weight Percent | Transparent |
| 0 | .97 | 30 | Yes |
| .14 | .81 | 28 | Yes |
| .20 | .76 | 27 | Yes |
| .39 | .59 | 24 | Yes |
| .53 | .41 | 23 | Yes |
| .60 | .28 | 23 | Yes |
| .59 | .15 | 23 | Yes |

EXAMPLE 6

This example illustrates the relative percent of light transmission with polycarbonate and polystyrene compositions containing 1 percent by weight of siloxane copolymer.

The various fluids shown in Table 4 below were mixed with the molten polystyrene or polycarbonate in a screw type injection molding machine. The transmission of each sample was determined according to ASTM D-1003-61.

TABLE 4

| Thermoplastic Polymer | Siloxane Compositions | | | Percent Light Transmission Relative To The Unmodified Polymer |
|---|---|---|---|---|
| | $C_6H_5Si/(CH_3)_2Si$ | $C_6H_5$ Wt. Percent | $CH_3O/Si$ | |
| Styrene | 1.06 | 33 | .72 | 97 |
| Styrene | .72 | 28 | .78 | 95.4 |
| Polycarbonate | .98 | 31 | .90 | 90.8 |

EXAMPLE 7

This example illustrates the reduced friction and wear properties associated with the transparent compositions of this invention.

Test bars of polystyrene thermoplastic (Dow Chemical Styron® GP 686) and an aromatic polycarbonate thermoplastic (General Electric Lexan® 101) were prepared both with and without 1 percent by weight of a siloxane copolymer. The siloxane copolymer had a ratio of phenylsiloxane units to dimethylsiloxane units of 0.72, a phenyl radical content of 28 weight percent, and a ratio of methoxy groups to silicon atoms of 0.90. The test bars (3 mm × 12.7 cm × 1.3 cm) were formed by injection molding.

The test bars were evaluated for friction and mar resistance on a crockmeter modified so that the test specimen is attached to a floating platform connected to a load cell that monitors and records instantaneous frictional forces. Oscillatory motion (60 cpm) across the test bars was provided by a 1.3 cm steel ball with a 0.9 Kg load. Tests were continued for 1000 cycles with the time of surface failure (scar) recorded. For comparison friction values were recorded at several points during the test. The test results are set forth in Table 5.

TABLE 5

| Thermoplastic | Cycles to Scar | Friction Initial | 20 Cycles | 1000 Cycles |
|---|---|---|---|---|
| Polystyrene | 7 | .081 | .131 | .148 |
| Polystyrene with siloxane | 85 | .056 | .118 | .138 |
| Polycarbonate | 55 | .075 | .15 | .119 |
| Polycarbonate with siloxane | >1000 | .038 | .048 | .063 |

EXAMPLE 8

This example illustrates the improved mold release properties associated with the transparent compositions of this invention.

Fluid composition (2) of Example 3 was mixed with polystyrene (Styron® 685 D of Dow Chemical) in amount of 1 percent by weight based on the weight of the polystyrene in a screw type injection molding machine. The lubricity of the molded article was tested as follows. The plastic mix was molded in the form of a cap on a threaded male mold and allowed to cool. A wrench was applied to the cap and the foot/pounds of torque required to remove the cap was recorded. For comparison the polystyrene blank and the same polystyrene containing 1 percent by weight of 30,000 cs (0.03 m²/s) polydimethylsiloxane fluid (200 fluid) were tested. Four samples of each were made and tested. The test results are set forth in Table 6.

TABLE

| | 1 | 2 | 3 | 4 | Average |
|---|---|---|---|---|---|
| Styron® 685 D | 54.6 (74)* | 54.0 (73.1) | 52.2 (70.7) | 53.1 (71.9) | 53.5 (72.5) |
| Styron® 685 D + 1% fluid (2) | 38.4 (52) | 37.8 (51.2) | 37.0 (50.1) | 36.2 (49) | 37.3 (50.5) |
| Styron® 685 D + 1% 200 fluid | 34.2 (46.3) | 34.2 (46.3) | 33.8 (45.8) | 33.4 (45.2) | 33.9 (45.9) |

This data shows the instant fluids are almost as good as 200 fluid in plastic lubricity and in addition the samples were clear while the 200 fluid samples were cloudy.
*Figure in parenthesis is the torque converted to newton-metre (N•m).

EXAMPLE 9

Fluid (2) of Example 3 was mixed in amount of 1 percent by weight with the acrylic polymer Plexiglas® V500 (Rhom and Haas Co.) to give a clear, lubricated plastic.

Equivalent results are obtained when the fluid of Example 1 is used in polyethylene terephthalate and polybutylene terephthalate.

That which is claimed is:

1. A transparent thermoplastic composition comprising in admixture a transparent thermoplastic resin selected from the group consisting of polystyrene, polyvinyl chloride, polyethylene terephthalate, polybutylene terephthalate, acrylic polymers, and polycarbonate and a minor amount of a fluid siloxane copolymer composed essentially of phenylsiloxane units of the general formula

and dimethylsiloxane units of the general formula

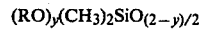

wherein R represents an alkyl radical having 1 to 6 carbon atoms, x is 2, 1 or 0 and y is 1 or 0, the siloxane copolymer having a ratio of phenylsiloxane units to dimethylsiloxane units in the range of 0.6 to 2, a phenyl radical content above 22 weight percent based on the total weight of the copolymer, and a ratio of alkoxy groups to silicon atoms above 0.3.

2. The composition of claim 1 wherein the siloxane copolymer is present in an amount of from 0.1 to 5.0 weight percent based on the weight of the thermoplastic resin.

3. The composition of claim 1 wherein R represents the methyl radical.

* * * * *

UNITED STATES PATENT AND TRADEMARK OFFICE
CERTIFICATE OF CORRECTION

PATENT NO. : 4,289,859
DATED : September 15, 1981
INVENTOR(S) : Robert E. Kalinowski; Gary A. Vincent It is certified that error appears in the above-identified patent and that said Letters Patent are hereby corrected as shown below:

In Column 3, line 17; the line reading "sulfonic acid action exchange resin (34.6 g, Amber-" should read "sulfonic acid cation exchange resin (34.6 g, Amber-"

In Column 3, line 43; in Table I under column headed "Weight Percent" should read "$C_6H_5$ Weight Percent"

In Column 3, line 45; in Table I under column headed "Dimethylsiloxane Units" should read "Phenylsiloxane Units Dimethylsiloxane Units"

Signed and Sealed this

Fifteenth Day of December 1981

[SEAL]

Attest:

GERALD J. MOSSINGHOFF

Attesting Officer     Commissioner of Patents and Trademarks